July 6, 1954

M. E. PATTILLO 2,682,724

REPLACEABLE ORNAMENT AND ATTACHING
PLATE FOR SPECTACLE FRAMES

Filed March 31, 1953

INVENTOR.
MILTON E. PATTILLO
BY
ATTORNEY.

Patented July 6, 1954

2,682,724

UNITED STATES PATENT OFFICE 2,682,724

REPLACEABLE ORNAMENT AND ATTACHING PLATE FOR SPECTACLE FRAMES

Milton E. Pattillo, Phoenix, Ariz.

Application March 31, 1953, Serial No. 345,808

3 Claims. (Cl. 41—10)

This invention concerns a replaceable ornament and attaching plate for spectacle frames.

To enhance the usefulness and value of spectacle frames, the use of ornaments has long been recognized. Many ornaments of various types have been added to or embedded in the frames.

I have found that ornaments attached to the sides of the frames and extending above and beyond their edges can be made very attractive and useful in ornamenting the spectacle frames, and in providing a new form of costume jewelry. Since, however, these ornaments extend beyond the bodies of the spectacles and are quite obtrusive, I have found that they should be made quickly and easily detachable so that the user may wear the spectacles either with or without the ornaments.

In view of the foregoing, one of the objects of my invention is to provide spectacle frames with obscure means for receiving and retaining ornaments which may be easily secured to or removed from the frames, so that the spectacle frames will not be marred for ordinary use, and so that the ornaments, when once attached, cannot be dislodged during ordinary use, but can be readily removed, without tools, when desired;

Another object of the invention is to provide spectacle frames with means for removably attaching ornaments by means of an attaching plate secured to said ornaments;

Another object is to provide an attaching plate which may be secured to an ornament and which will enable the user to removably attach the ornament to specially prepared spectacle frames;

Still another object is to provide a pair of eyeglass or spectacle frames with means to receive an ornament attaching plate which is constructed so that said ornament may be easily attached to said spectacle frames, or removed therefrom, without the use of tools, and when attached will be held firmly and securely.

Other objects will appear hereinafter.

I attain the foregoing objects by means of the devices and peculiar construction and combination of parts illustrated in the accompanying drawings, in which—

Similar numerals refer to similar parts in the several views.

Figure 1:
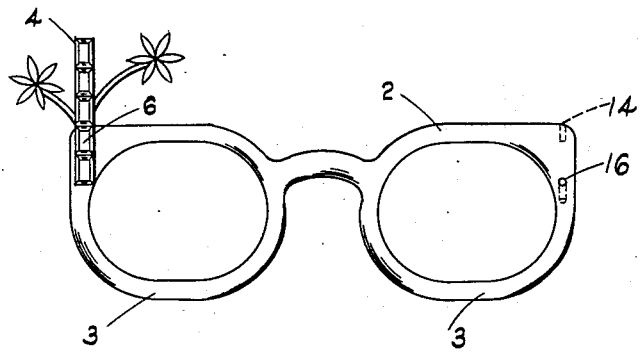
Figure 1 is a front elevation of a spectacle frame provided with one of my removable ornaments.
Figure 2:
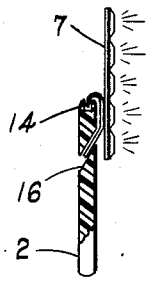
Figure 2 is a side view, drawn on a slightly larger scale showing the attaching plate held within the spectacle frame.

The frames 2 are preferably made of plastic and include rims 3 of standard shape and size. The ornament 4 is made of metal which includes a backing element 7 in which brilliants 6 are set. The design may be of any size, shape or color so long as it has a backing element 7 which will support the entire ornament.

An attaching plate 8, made of thin metal having spring-like qualities is securely attached to the back face of backing element 7. This is preferably done with solder, but screws or bolts may be used, if desired.

Figure 3:
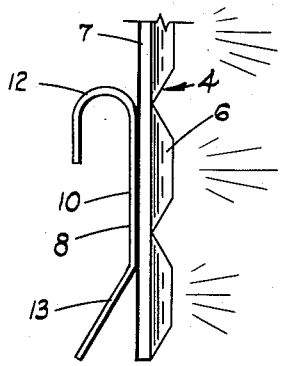
Figure 3 is an enlarged elevational view of the side of the spectacle ornament drawn on an enlarged scale.
Figure 4:
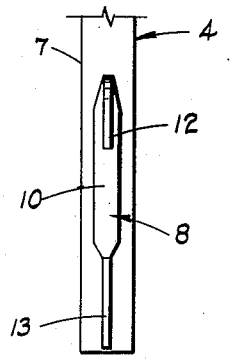
Figure 4 is an elevational view of the back of the attaching plate, also drawn on an enlarged scale.
Figure 5:
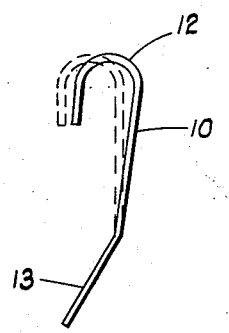
Figure 5 is a side elevation thereof as inserted in the spectacle frame.
Figure 6:
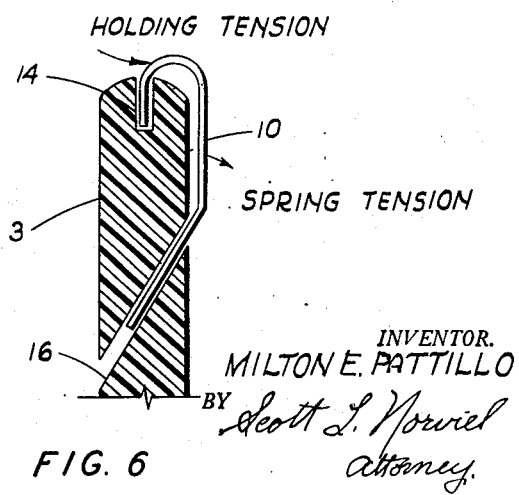
Figure 6 is a semi-diagrammatic view of the attaching plate in place in a spectacle frame, showing spring tension of the several parts which secures retention of the plate on the frame.

The attaching plate 8 is substantially rectangular and is composed of a flat thin, comparatively wide central body portion 10 to the top of which a backwardly extending hook 12 is attached. An angularly downwardly and rearwardly directed prong 13 is formed at the bottom of body 10. This structure may be stamped from thin sheet nickel, stainless steel, or other suitable material. The extensions at each end are then bent to form the hook and prong as shown particularly in Figures 3, 5, and 6.

If desired, the edges of the extensions may be swaged and compressed so that they have round sections.

The spectacle frames have vertical holes 14 drilled on their top faces adjacent their side edges. These holes are sized to receive hook 12 of attaching plate 8 on either the right or left side of the frame, as desired.

On the front faces of the side edges of the frame, and in lens rims 3, there are holes 16, sized to receive prong 13 of plate 8, which slant inwardly and downwardly from the front face. The angle at which prong 13 is bent is less relative to the plane of plate body 10 than the angle which holes 16 bear to the front faces of rims 3.

When the attaching plate is to be attached, this structure causes the body 10 to extend outwardly when the prong 13 is first inserted into hole 16 on the side of the lens rim. The body 10 is then sprung inwardly toward frame 3 slightly so that hook 12 will enter hole 14 above the hole 16 into which prong 13 has been started, and the plate is then pressed downward. After hook 12 has entered hole 14 and prong 13 is in hole 16, further movement downward forces both the hook and prong into their respective holes and secures the plate on the frame. When secured, the body 10 tends to spring outward at the top from the front face of rim 3, and this tension binds hook 12 in hole 14, while the bending stress applied to prong 13 when body 10 is pressed toward frame rim 3 secures it in hole 16.

When the attaching plate 8 is to be removed from the frame 2, then attaching procedure is reversed, and the plate is first moved upward, relative to the frame and then upward and outward.

While I have just described the attaching and detaching of plate 8 from frames 2, it is to be understood that when the plate 8 is secured to ornament 4, the procedure is just the same. Further, since frames 2 are drilled on each side with holes 14 and 16, ornaments on attaching plates may be applied to either side or both sides of the frames.

It is to be noted that when the prong and hook are attached to the frame 2 they are under tension in the respective holes 14, and 16. The tension on prong 16 tends to draw its tip outward from the frame and its root toward the frame. Hook 12 can be given a bend sufficient so that it too is under tension when it and the prong are fully inserted. In addition it is to be noted that the attaching plate and the ornament on it is held against twisting or rotating on the axis of the hook by the angular position of prong 13. The portion of hook 12 inserted in hole 14 is vertical relative to the frame 2, and thus might permit the ornament 4 to rotate relative to the plane of the frame except for the fact that the prong 13 extends into hole 16 in a plane substantially radial to the axis of hole 14. Insertion of prong 13 therefore holds plate 8 and ornament 4 in place and resists rotation of hook 12 in hole 14. The result of the structure as a whole is that the ornament is very securely held against unwanted movement when attached to the frames as above explained. It is also held against unintentional removal and this cannot be had unless the proper upward and outward detaching movement is applied to the ornament and plate.

From the foregoing it will be seen that I have provided an efficient, cheaply and easily made means for removably attaching ornaments securely to spectacle frames which are easily made to receive them.

I claim:

1. Ornaments for attaching to and detaching from a spectacle frame having vertical holes formed in the top portions of the frame near their side ends, and holes formed in the sides of the frames disposed below said vertical holes extending angularly downwardly and rearwardly from the front faces of said frames, composed of ornaments having a backing element, an attaching plate secured to said element of spring like metal having a flat body, a hook at its top turned rearward and downward and engaging in one of said vertical holes in said frames, and a prong at the bottom extending downwardly and rearwardly into said holes formed in the sides of said frames; said prong normally extending at an angle of less degree relative to the face of said frame than said angular holes therein thereby binding said prong and said hook in said respective holes.

2. A replaceable ornament and attaching plate secured thereto for removably attaching said ornament to spectacle frames having vertical holes formed in their top portions near their ends and angular holes, formed in their sides disposed below said vertical holes, and extending inwardly and downwardly from the front faces of said frames, consisting of an attaching plate having a flat body secured to the back of said ornament, a backwardly and downwardly extending hook formed at the top of said plate, and a downwardly and rearwardly angularly extending prong formed at the bottom of said plate; said hook and said prong being inserted into the top and front holes in said spectacle frames and secured therein by tension produced by diverging angles between said hook and said prong and the extent of the respective holes in said frame in which they are inserted.

3. A removably attachable ornament for spectacle frames having an upper portion, lens rims there below on each side and front faces on said lens rims, and a vertical hole drilled in said upper portion adjacent one end of said frame and an angular hole formed in said lens rim disposed below said vertical hole extending downwardly and rearwardly from the front face of said rim, composed of an ornament having a backing element, an attaching plate secured to said backing element having a flat central body portion, a rearwardly bent downwardly terminating hook formed at the top of said body, and a rearwardly and downwardly angularly extending prong on the bottom of said body; said hook being inserted in the vertical hole in said frame and said prong being inserted in the angular hole in said lens rim, and said hook and said prong being resiliently retained in said respective holes by reason of angular divergence between the axes of said hook and prong and the axial extent of said holes.

References Cited in the file of this patent

UNITED STATES PATENTS

| Number | Name | Date |
| --- | --- | --- |
| 2,566,236 | Meddoff | Aug. 28, 1951 |
| 2,599,463 | Lamb | June 3, 1952 |

FOREIGN PATENTS

| Number | Country | Date |
| --- | --- | --- |
| 366,740 | Great Britain | Feb. 11, 1932 |
| 359,756 | Italy | July 4, 1938 |